Figure 3:
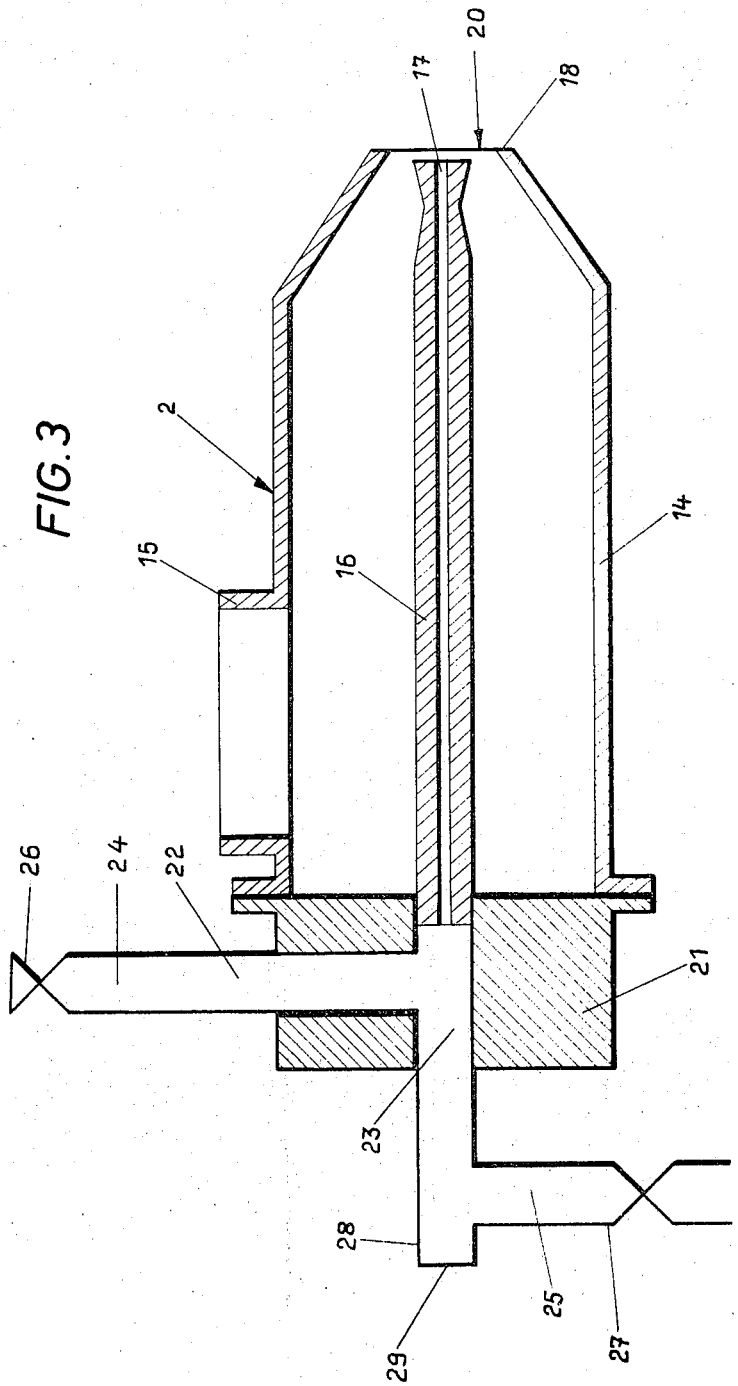

United States Patent [19]
Ensslin et al.

[11] 3,776,147
[45] Dec. 4, 1973

[54] DISPOSAL OF PLASTICS

[75] Inventors: Fritz Ensslin, Bad Harzburg;
Gerhard Frenzel, Astfeld; Erich Löbermann, Oker, all of Germany

[73] Assignee: Preussag Aktiengesellschaft-Metall, Goslar, Germany

[22] Filed: Feb. 8, 1972

[21] Appl. No.: 224,571

[30] Foreign Application Priority Data
Feb. 19, 1971 Germany .................. P 21 08 008.0

[52] U.S. Cl. .................... 110/7 S, 110/8 R, 110/15
[51] Int. Cl. ............................................. F23g 7/00
[58] Field of Search ...................... 110/7 S, 8 R, 14, 110/15, 18 R

[56] References Cited
UNITED STATES PATENTS
3,344,758  10/1967  Wotschke ............................ 110/18
2,977,255  3/1961   Lowry ............................... 110/14 X
3,357,375  12/1967  Brophy .................................. 110/7
3,490,395  1/1970   Boyd et al. ............................ 110/18
3,572,265  3/1971   Stockman ............................. 110/18

Primary Examiner—Kenneth W. Sprague
Attorney—Toren and McGeady

[57] ABSTRACT

To eliminate plastics waste and recover the metals and metal compounds contained in the waste, the plastics waste, whether in a solid, pasty or liquid form, is converted into a combustible fluid-like form and is directed through a burner into a combustion chamber. The combustion of the waste results in combustion gas and fly ash which is cooled and directed through a separator to obtain the metals and metal compounds from the fly ash in the form of oxides.

11 Claims, 3 Drawing Figures

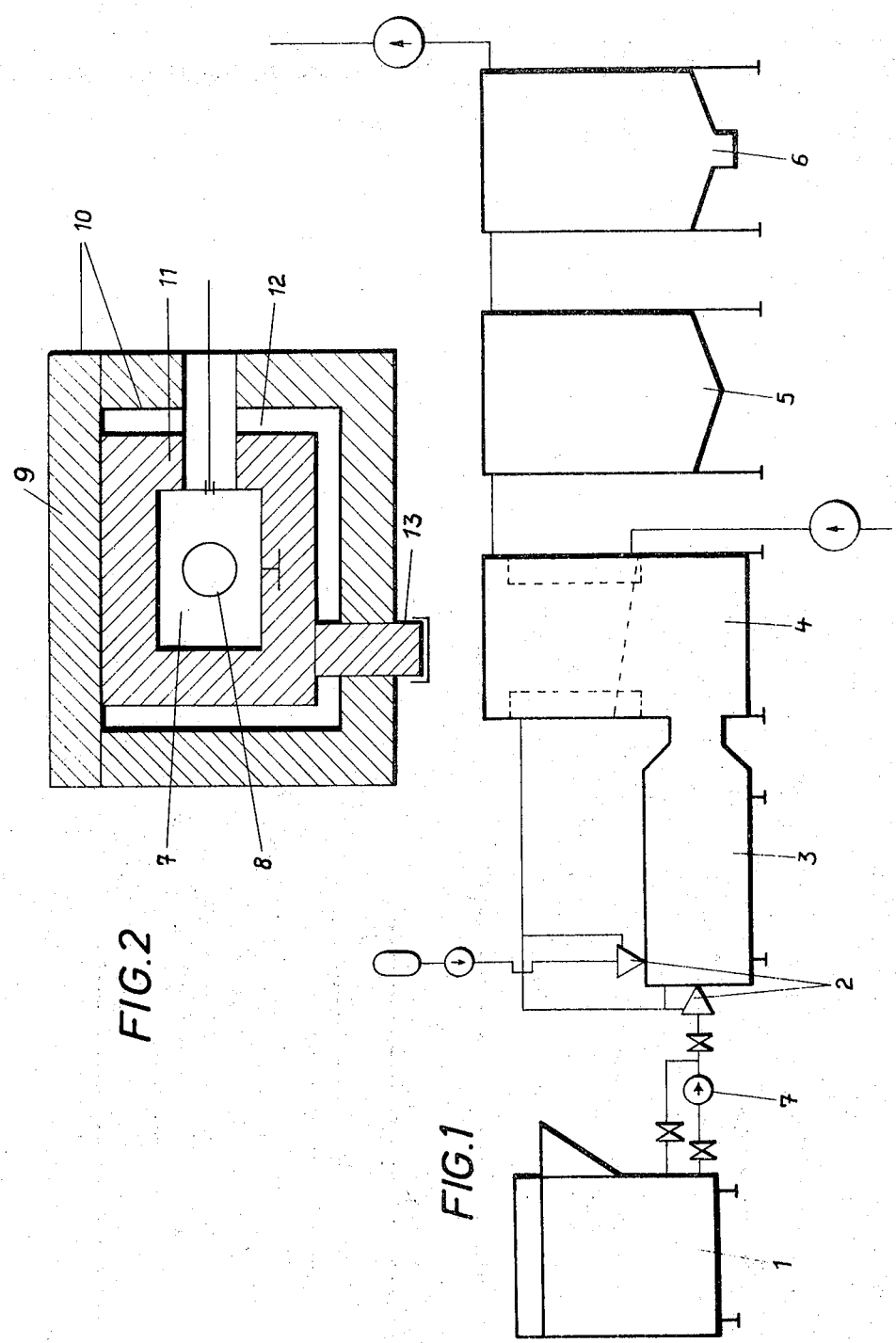

DISPOSAL OF PLASTICS

The invention relates to a process for recovering metals, either as the elementary metals or in the form of inorganic compounds, from plastics waste and from the waste materials arising during the manufacture of plastics, that is to say synthetic resins, the metals being recovered by burning the organic material. All the waste materials intended here will in what follows be termed "waste."

Various processes are known for disposing of wastes by burning. For example it is known to dispose of cellulose waste liquor by burning it in a combustion chamber in a tangentially introduced stream of air.

A process is also known in which substances suspended or dissolved in an oxygen resistant liquid are disposed of by burning in gases containing oxygen. During this process the non-oxidisable liquid evaporates. The substances dissolved or suspended in the liquid are burnt in a helical stream of gases.

In a further known process trash, particularly chemical residues, is burnt in a rotary drum in a stream of air introduced tangentially, the drum rotating about its longitudinal axis. However there cannot be derived from this state of the art any method for eliminating plastics waste with simultaneous recovery of the metals and metal compounds contained therein, nor can there be derived the special means necessary for solving this problem.

There are processes known for burning plastics by-product wastes, that is to say waste material arising during the manufacture of plastics. These wastes contain the metal catalysts and stabilisers used for polymerising or polycondensing the plastics materials. Some of the metal catalysts and stabilisers are compounds of rare and highly valuable metals. In the conventional processes for eliminating the byproduct wastes these valuable metals are lost and this can be a considerable economic disadvantage.

The object of the invention is to provide a process for eliminating, that is to say destroying wastes which contain valuable elements either as free elements or in the form of inorganic or organic compounds, by burning the plastics waste with simultaneous recovery of the metals or metal compounds in the form of a concentrate.

According to the invention, in a method of eliminating plastics waste with recovery of the metals or metal compounds contained in the waste, the waste in solid, pasty or liquid form is first of all converted into a combustible form, the organic components are then burnt, the resulting mixture of combustion gas and fly ash is cooled, and finally the fly ash containing the metals or metal compounds is separated in the form of a concentrate. In this way, the metals or metal compounds are recovered from solid, pasty or liquid wastes, even in those cases where the waste material contains less than 1 percent of the inorganic substance.

In order to convert the waste into a combustible form, the waste when solid or pasty is melted and heated to a temperature favourable for combustion. In some cases, depending on the nature of the waste and the concentration of fillers, thinners and the like, it can be advantageous to add to the waste before combustion substances for promoting the combustion, particularly oils or other easily combustible organic substances.

The liquefied waste in liquid or molten form is preferably burnt by spraying it with the help of a gas containing oxygen, preferably preheated air. By burning in preheated primary air with the addition of secondary air it becomes possible to control precisely both the combustion temperature and the rate of combustion.

The resulting mixture of combustion gases and fly ash is preferably subjected to a preliminary cooling in a heat exchanger, final cooling being effected in a final cooler. The fly ash is separated from the cooled mixture by known methods, preferably by precipitation in a dust filter.

The separated fly ash contains, in concentrated form, the metals or metal compounds initially present in the waste, the metals occurring in the fly ash in the form of oxides, chlorides or sulphates. These metal compounds can be recycled in the known way by adding them to the raw materials used for manufacturing the plastics.

The method according to the invention is suitable, in principle, for destroying all combustible plastics, for example polyolefines, polyesters, polyamides, or polyurethanes, their manufacturing by product wastes and wastes which have been made combustible by adding combustion promoters, as well as many other materials.

The process according to the invention allows the catalysts used in the manufacture of these plastics to be recovered, as well as additives, particularly stabilisers, the recovered product taking the form of oxides or other inorganic compounds of, for example, titanium, antimony, tin, cobalt, germanium or the like.

The invention also includes an apparatus suitable for carrying out the method, the apparatus comprising a melt container for containing the plastics waste, a combustion system consisting of a combustion chamber and a burner, a heat exchanger for subjecting the resulting mixture of combustion gases and fly ash to a preliminary cooling, a cooler, connected downstream of the heat exchanger, a filter for separating the fly ash, and a conveyor.

An example of an apparatus according to the invention is illustrated in the accompanying drawings, in which:

FIG. 1 is a diagrammatical representation of the entire installation, consisting of a melt container 1, a combustion system consisting of a burner 2 and a combustion chamber 3, a heat exchanger 4, a cooler 5, a separator 6 for separating the fly ash and a conveyor 7.

FIG. 2 shows the conveyor embedded in a sand jacket. The conveyor 7, for example a pump, and a pipe 8 for the plastics waste are both embedded in the sand jacket 11, which is itself enclosed in insulating material 9 supported by a sheet metal jacket 10. The sand is heated by a heater 12. There is an outlet pipe 13 for removing the sand.

FIG. 3 shows the burner 2 in the combustion chamber 3. The burner 2 consists of an outer air nozzle 14 with an air inlet connection 15, and an inner nozzle 16 for conveying the plastics waste. The inner nozzle 16 is in the form of a lance, whose outlet opening 17 is positioned centrally in the outlet opening 18 of the air nozzle, so as to form an annular air gap 20. At its root end the air nozzle 14 is connected to a feed connection piece 21 containing two feed channels 22 and 23, perpendicular to each other, for feeding the liquid or molten plastics waste. The root of the inner nozzle 16 is secured in the outlet end of the feed channel 23. The feed of plastics waste, with or without a combustion promoter, is ensured by feed channels 24, 25 leading into the feed channels 22, 23. The feed channels 24, 25 contain feed control valves 26, 27. A special advantage is that the feed of plastics waste to the burner is controlled by control valves 26, 27 which are embedded in the heated sand. Due to this and due to the simple construction of the feed channels 22 to 25, the inner nozzle 16 cannot become choked or clogged up. The burner 2 is arranged so that it can be cleaned without any need to dismantle it and without any interruption in the flow of liquid or molten plastics waste through the feed channels 24 and 22. For cleaning the burner 2 it is merely necessary to open a closure plug 29 in the connection 28 of the feed channel 25. Once this plug has been removed the feed channel 23 and the inner nozzle 26 can be mechanically cleaned.

The method of operating the apparatus will now be described on the basis of an example:

In this example solid plastics waste is fed, either directly or with the help of a feed apparatus, to the melt container 1. The melt container is constructed to allow liquid or pasty plastic waste to be introduced, either by gravity flow or by means of a feeding device. The container 1, containing the plastic waste, is heated in the known way, for example electrically, to melt the waste and/or to bring it to a desired temperature and viscosity. If the charge is a solid waste the melting can be accelerated, and a constant temperature can be ensured, by agitating the melt and/or by using circulating pumps. During the agitating combustion promoters can be added. Circulating pumps may be used, arranged so that they project high speed jets of molten material against solid waste situated in front of a grating, melting and/or size reducing the solid waste so that it can flow.

As soon as the waste has acquired the desired temperature, which depends on its melting point and on the viscosity of the melt, the liquid or molten waste is conveyed through the feed pipe 8 to the combustion system consisting of the burner 2 and the combustion chamber 3. To prevent the molten mass from freezing in the pipe 8, this pipe together with all the necessary conveying, control and screening devices are embedded in a sand jacket 11 which is heated in a controlled manner. This arrangement ensures that the plastics waste cannot coke up due to local overheating. A further advantage of the sand jacket is that if a leak occurs in the conveying system the fire hazard is minimised.

In a particular advantageous modification the liquid waste is sprayed under a specified pressure by the burner 2 and is burnt in a current of preheated primary air. Simultaneously secondary air can be blown in centric-symmetrically in the direction of the flame, to provide the excess air necessary for ensuring complete combustion. Assuming that the liquid waste is fed at a constant rate, the flame temperature can be adjusted by precise adjustment of the primary and secondary air.

If desired the combustion system can itself be heated, or preheated, by means of an auxiliary burner, for example an oil or a gas burner. This provides an igniting flame for initiating combustion and for sustaining combustion.

The combustion chamber 3 consists of a steel jacket suitably lined, the lining being of a kind which does not react with the fly ash under the prevailing operating conditions. Suitable materials for the combustion chamber lining are for example refractory bricks made of chromium-magnesite, fireclay, Dynas, silica or the like.

Downstream of the combustion chamber there is a heat exchanger 4, connected to the combustion chamber either directly or through a connecting channel. The mixture of combustion gases and fly ash is cooled in the heat exchanger 4, which utilises the heat to warm the primary and secondary air. The heat exchanger can if desired also contain a further tube bundle through which a heat transfer medium flows, so that the combustion heat taken from the mixture of combustion gases and fly ash can be utilised elsewhere for heating purposes. In the heat exchanger 4 the mixture of combustion gases and fly ash is cooled down far enough so that the downstream cooler 5 can be constructed of ordinary steel. The cooler 5 delivers the mixture at a controlled temperature to the separator 6, for example a cloth-tube filter. The temperature should be such that the cloth-tube filter cannot itself cool down to the prevailing dewpoint. On the other hand of course the temperature must not be high enough to damage the filter.

The fly ash separated by the filter contains the metals present in the initial plastics waste, the metals appearing in the fly ash in the form of oxides, mixed oxides or other inorganic compounds, whose nature depends on the nature of the waste material. The functioning of all the parts of the apparatus, including the filter, can be controlled by conventional control devices.

What we claim is:

1. A method of eliminating plastics waste with the recovery of metals or metal compounds contained in the waste in the form of a concentrate, comprising the steps of converting the plastics waste into a combustible form, burning the organic components of the plastics waste in an oxidizing manner to form a mixture of combustion gas and fly ash, cooling the combustion gas and fly ash, and separating the fly ash containing the metal or metal compounds in the form of a concentrate.

2. A method, as set forth in claim 1, including treating one of solid, pasty and liquid plastics waste for conversion into a combustible form by heating the waste to a temperature favoring combustion so that the waste is in a molten condition.

3. A method, as set forth in claim 1, including burning liquid plastics waste by spraying the plastics waste in a stream of preheated primary air.

4. A method, as set forth in claim 1, including adding combustion promoters to liquid plastics waste, and burning the liquid plastics waste with the combustion promoters by spraying the mixture thereof in a stream of preheated primary air.

5. A method, as set forth in claim 3, including a flow of secondary air in an annular-centric manner relative to the plastics waste being burned in the stream of preheated primary air.

6. A method, as set forth in claim 1, including treating solid plastics waste by directing a jet of molten waste into the solid waste for conversion of the solid waste into a combustible form.

7. A method of eliminating plastics waste with recovery of the metals and metal compounds contained in the waste, comprising the steps of heating the plastics waste to a temperature favoring combustion so that the waste is in a fluid state, conveying the fluid state plastics waste under insulated conditions to a combustion chamber, spraying the liquid state plastics waste into the combustion chamber under a specified pressure and burning the waste in a current of preheated primary air and at the same time blowing secondary air centric-symmetrically in the direction of the flame generated by the burning of the waste in the primary air, withdrawing the products of combustion including combustion gases and fly ash from the combustion chamber and cooling them in a separate space, and conveying the cooled combustion gases and fly ash to another separate space and separating the fly ash containing the metal or metal compounds in the form of a concentrate.

8. Apparatus for eliminating plastics waste with recovery of the metals and metal compounds contained in the waste, comprising a melt container for converting the waste to a fluid state, walls forming a combustion chamber spaced from said melt container, a burner arranged to direct air and the fluid plastics waste into said combustion chamber, a conveyor for transporting the fluid plastics waste from said melt container to said burner, a heat exchanger spaced from and connected to said combustion chamber for receiving and cooling the combustion gas and fly ash resulting from the combustion operation, a cooler connected to said heat exchanger for bringing the combustion gas and fly ash from said heat exchanger to a selected temperature, and a separator connected to said cooler for receiving the cooled combustion gas and fly ash and for separating the collecting the fly ash which contains the metals or metal compounds from the plastics waste in the form of oxides.

9. Apparatus, as set forth in claim 8, including a grate located in said melt container, and means for directing jets of molten plastics waste against solid plastics waste located on said grate for converting the solid plastics waste to a combustible form.

10. Apparatus, as set forth in claim 8, wherein a heatable sand jacket encloses said conveyor between said melt container and said combustion chamber for insulating said conveyor.

11. Apparatus, as set forth in claim 8, wherein said burner comprises a lance-shaped nozzle directed into said combustion chamber, means for supplying at least two separate streams of fluid plastics waste to said nozzle, and an outer air nozzle concentrically arranged about said lance-shaped nozzle with the outlet opening of said lance-shaped nozzle located centrally in the outlet opening of said outer air nozzle.

* * * * *